Jan. 4, 1966  K. RANTSCH ET AL  3,227,884
INDICATING DEVICE FOR MEASURING SCALES USING MAGNETIC AND
PHOTOELECTRIC SCANNERS WITH A SINGLE SCALE
Original Filed Nov. 17, 1959  2 Sheets-Sheet 2

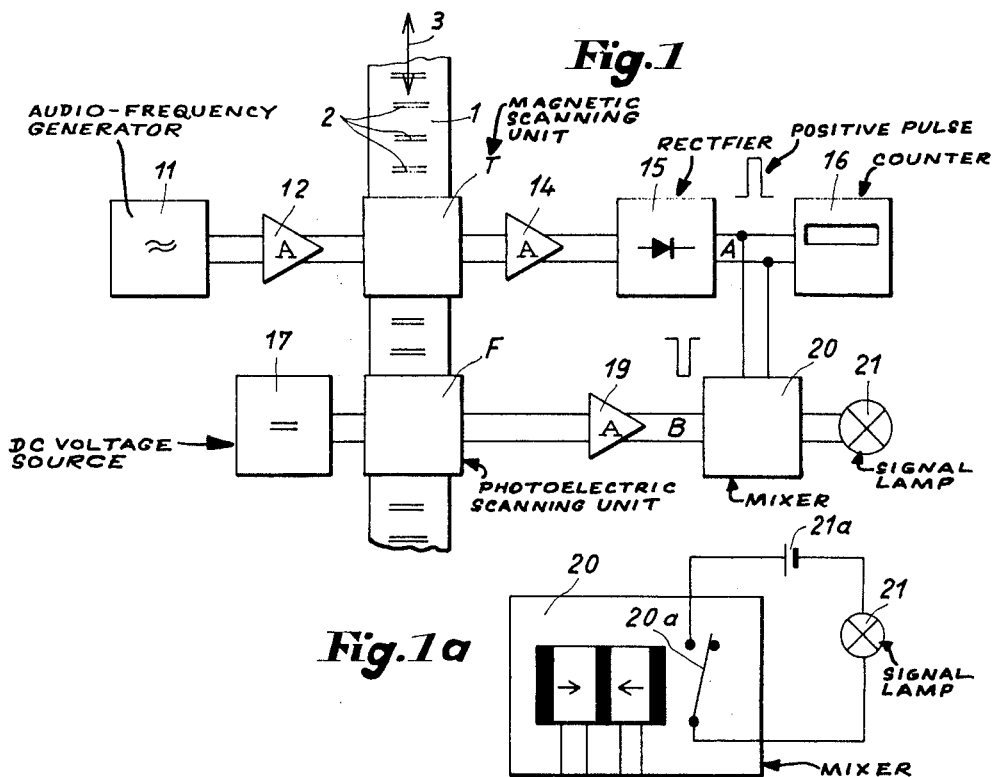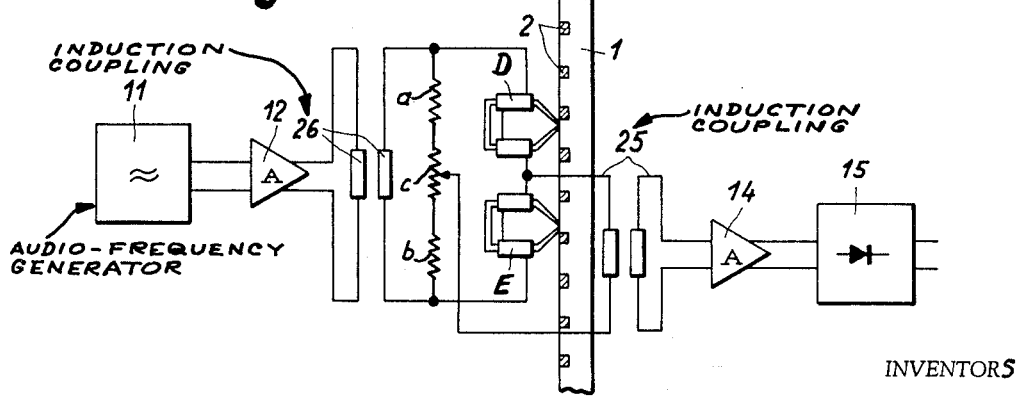

INVENTORS
KURT RANTSCH
OTTO TROTSCHER

BY Toulmin & Toulmin
ATTORNEYS 3,227,884
INDICATING DEVICE FOR MEASURING SCALES USING MAGNETIC AND PHOTOELECTRIC SCANNERS WITH A SINGLE SCALE
Kurt Rantsch and Otto Trotscher, Wetzlar (Lahn), Germany, assignors to M. Hensoldt & Sohne, Optische Werke, Aktiengesellschaft, Wetzlar (Lahn), Germany
Original application Nov. 17, 1959, Ser. No. 853,564, now Patent No. 3,170,100, dated Feb. 16, 1965. Divided and this application Apr. 24, 1964, Ser. No. 362,420
2 Claims. (Cl. 250—219)

This application is a division of application Serial Number 853,564 filed November 17, 1959, now Patent No. 3,170,100.

The present invention relates to the measuring scales used in machine tools. More in particular, the present invention relates to an automatic device for indicating automatically the adjusting position of measuring scales in machine tools.

It is known in the art to equip the measuring scales in machine tools with a photoelectric scanning unit. The unit is displaced relative to the measuring scale and when passing over the division marks on the scale, pulses are photoelectrically produced which are then recorded in a counter.

These known scanning devices are highly sensitive to disturbance and are extremely unreliable. It may occur, for example, that the current of the light source is interrupted at the very moment when the scanning unit passes over a division stroke on the scale. The division line is not recorded, and an inaccurate measured value is indicated. Furthermore, the scanning elements as for example the photoelectric cell or photodiode are highly temperature-sensitive and are subject to photoelectric fatigue. Furthermore, it frequently occurs that the scale surface becomes dirty. In the course of operation of the machine tools consequently the division strokes cannot be properly scanned and recorded by the photoelectric unit.

For all these reasons it has become necessary to supplement the aforementioned unit with visually perceptible reading means wherefrom the adjusted position of the scale can be read.

This is necessary in order to check the value of the adjusted position and verify, and if necessary, correct the value recorded by the photoelectric unit. It will be easily apparent that the advantage of a photoelectric unit is entirely lost by the necessity of this constant and non-automatic checking and correcting of the operation of the photoelectric unit.

It is an object of the present invention to provide an apparatus for automatically indicating the adjusted position of measuring scales in machine tools which operates entirely automatically and with a high degree of accuracy, without checking and correcting.

It is another object of the present invention to provide an apparatus for automatically indicating the adjusted position of measuring scales in machine tools which is substantially self-controlling and which is provided with signalling means indicating to the operator the rare instances where the measurement has been recorded inaccurately.

It is a further object of the present invention to provide an apparatus for automatically indicating the adjusted position of measuring scales in machine tools with which the scale can be scanned very rapidly.

Further objects of the present invention will become apparent as the description thereof proceeds. The objects are achieved by the apparatus of the invention according to which two separate scanning and indicating units are provided operating on the basis of different principles, one unit operating, for example, photoelectrically, the other unit operating magnetically, and which two units are interconnected in such a manner that they control each other. The apparatus is equipped with a signalling device giving a signal to the operator whenever different results are measured by the two scanning and indicating units.

According to one aspect of the present invention in a preferred embodiment thereof, it is suggested to provide a reading station and a scale, which two elements are movable with respect to each other. The scale includes a base member, and there are associated with such member means defining at least two different detachable, spatially periodically changing characteristic properties thereof. For example, such means may be division strokes contrasting optically with respect to the base member; such division strokes may exhibit a different degree of magnetic conductivity as the base member; there may be periodically distributed grooves defining a rack capable of meshing with a feeler pinion. All such periodically changing characteristics on and at the base member define a scale of length.

The reading station includes two separate units individually responsive to a particular type of characteristic, for example, a photoelectric scanner for the optical contrast, a magnetic reading head for the magnetic conductivity and a pinion for meshing the rack. Each scanner unit produces an output and the two outputs are compared with each other in such a manner that a deviation of one output, representing the indication of the scale of length as reproduced by the periodic changes of one characteristic, from the other output representing the indication of the same scale of length but being differently reproduced, is readily ascertainable and indicated.

The apparatus of the invention is preferably used in combination with a metal scale composed of ferro-magnetic material with cut-in division marks. Such a scale can be scanned both with photoelectric scanning means, comprising, for example, a photoelectric cell, responding to the black recesses forming the division marks, and magnetic scanning means comprising, for example, a magnetic recording head responding to the change in magnetic flux at the locations of the division marks.

Since the scales are usually longer than wide it will be advantageous to use, as a magnetic scanning and indicating unit, a pair of magnetic recording heads coupled by a bridge connection, one recording head scanning the surface of the scale above or below the division marks, the other head scanning the division marks, thereby producing a change of the bridge voltage which is then amplified and used for operating indicating means such as, for example, a counter.

According to the invention it is, however, also possible to use a single magnetic recording head constituting a coupling link between a frequency source and the indicating device and operating the latter with its secondary voltage.

The invention will be more fully appreciated upon the following detailed description of the drawings, wherein:

FIGURE 1 is a schematic plan view of the basic embodiment of the automatic indicating apparatus of the present invention;

FIGURE 1a is a diagram of the pulse mixing element used in the embodiment of the invention;

FIGURE 2a is a schematic view of a magnetic scanning and indicating unit of the embodiment shown in FIGURE 1, showing a pair of magnetic recording heads connected by a bridge circuit;

FIGURE 2b is a plan view of a portion of a measuring scale illustrating the portions thereof scanned by each of the recording heads shown in FIGURE 2a.

Figure 2B:
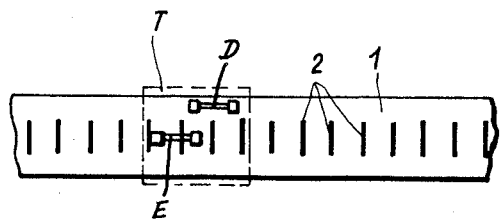

A basic embodiment of the invention will next be described in detail with reference to FIGURES 1 to 3 of the accompanying drawings, wherein 1 designates a scale connected with a machine tool (not shown), and having cut-in division marks 2. The scale can be displaced in the direction as indicated by arrow 3 for adjusting a machine tool. The body of the scale is composed of a ferro-magnetic material. Above scale 1 an element T is disposed responding to a change of the magnetic flux in scale 1. The element T is fed by an audio-frequency generator 11 via an amplifier 12, and it may consist of such a structure as shown, for example, in FIGURES 2a and 3, to be described in greater detail further below. The output voltage of element T is supplied to an amplifier 14, and from the latter to a rectifier 15. The latter rectifies the voltage in such a manner, that a positive pulse is obtained when passing the element T over the division mark 2 in scale 1. This positive pulse A is supplied to a counter 16 which it drives, so as to count the division marks over which element T is passed.

According to the invention, the scale is provided with a second scanning device such as a photoelectric scanning device F comprising light sensitive elements known per se such as, for example, photoelectric cells, photo-diodes and the like, and energized through a D.C. voltage source 17. When passing photoelectric scanning element F over a division mark on scale 1, a voltage change is produced which is supplied to amplifier 19 and fed to a mixer stage 20 with such a polarity that a negative pulse B is effective in mixer 20. This negative pulse has the same amplitude as the positive pulse produced in the electromagnetic scanning system. The positive pulse as well as the negative pulse are supplied to a pulse mixing element 20 which, in turn, is connected with signalling means such as a lamp 21. As a pulse mixing element it is possible to use, for example, a differential relay as shown in FIGURE 1a, wherein the positive and negative pulses A and B neutralize each other, thereby maintaining the contact 20a in the opened position and interrupting the circuit in which signalling lamp 21 is disposed, but closing contact 20a as soon as only a negative pulse B or a positive pulse A is supplied to the relay, thereby closing the circuit of signalling lamp 21 and supplying the same with power from current source 21a.

It is thus to be apparent that division strokes 2 provide for a modulation of two physical properties of base member 1; one modulation being the power of reflecting light, the other being the magnetic-conductivity. Both the modulations are of similar frequency.

The element T of the electromagnetic scanning unit may consist, for example, of a structure shown in FIGURE 2a. The carrier frequency bridge 24 is supplied with an audio-frequency of several thousand cycles from the audio-frequency generator 11 via amplifier 12 and inductive coupling 26. The voltages which are then supplied to resistances $a$ and $b$ and the potentiometer $c$ between resistances $a$ and $b$ are also supplied to magnetic reading heads D and E. Potentiometer $c$ zero-balances the bridge and magnetic reading heads D and E scan the surface of scale 1. As shown in FIGURE 2b, magnetic reading head D passes over the smooth portion of the surface of scale 1, whereas head E passes over the division marks 2 of scale 1, the division marks consisting, for example, of rectangular recesses in scale 1, filled with a diamagnetic material as, for example, copper. When passing magnetic reading head E over the division marks consisting of the diamagnetic material, whereas the regular surface of scale 1 consists of ferromagnetic material, the impedance of head E and thereby the bridge voltage is changed. The output of the bridge is supplied to an output transducer such as, for example, the inductive coupling 25 which, in turn, is connected to amplifier 14 and rectifier 15, the rectified pulses, for example, positive pulses, then being supplied both to counter 16 and to pulse mixer 20, in which latter they are joined by the negative pulse produced in the photoelectric scanning unit.

Figure 3:
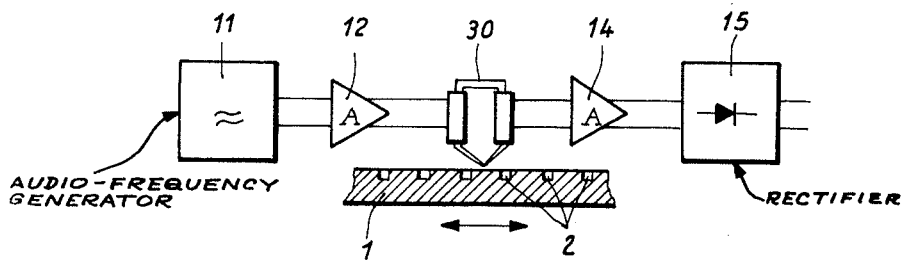
FIGURE 3 is a schematic view of the magnetic scanning and indicating unit of the embodiment shown in FIGURE 1 comprising a single magnetic recording head.

The element T may also consist of only one magnetic recording head 30 as shown, for example, in FIGURE 3. The head 30 is supplied with an alternating voltage from an A.C. source 11 via amplifier 12. The output of head 30 is connected with amplifier 14 and rectifier 15. The head 30 thus couples A.C. source 11 and amplifier 12 with amplifier 14 and rectifier 15 and operates by transmitting a change of the factor of magnetic coupling which change is effected when passing head 30 over the diamagnetic fields of division marks 2 in the ferromagnetic surface of scale 1.

The aforedescribed automatic indicating device of the present invention operates in the following manner:

As long as the pulses of rectifier 15 and amplifier 19 occur simultaneously, the negative and positive pulses neutralize each other in the pulse mixer 20, thereby maintaining contact 20a in the position shown in FIGURE 1a, interrupting the circuit of signalling lamp 21. The positive pulse of the rectifier 15 operates the counter 16 correctly.

As soon as one of the scanning devices fails to operate, one of the pulses A and B is missing, thereby failing to compensate the other pulse in pulse mixer 20. Consequently, relay contact 20a is closed and signalling lamp 21 is supplied with power from current source 21a. The signalling lamp 21 thus shows the failure in operation of the indicating device. The operator then knows that he has to check the adjusted position of the machine tool and verify whether this position is correctly indicated in counter 16 and eventually to correct the indication of counter 16.

The apparatus of the invention is preferably used in combination with a measuring scale of ferro-magnetic material and having cut-in division marks, which recesses are filled in with a diamagnetic material, such as copper, bismuth, antimony, lead, silver, tellurium, and the like. Some of these substances can be blackened so as to give a better response to the photoelectric scanning means.

It will be understood that this invention is susceptible to modification in order to adapt it to different usages and conditions, and, accordingly, it is desired to comprehend such modifications within this invention as may fall within the scope of the appended claims.

What is claimed is:

1. Apparatus for automatically indicating the adjusted position of a reading station relative to a measuring scale in machine tools, comprising, in combination, a photoelectric scale scanning and indicating unit, and a magnetic scale scanning and indicating unit, a scale having reflecting marks of different magnetic permeability, means on said scale for producing a negative pulse in connection with said photoelectric unit and means on said scale for producing a positive pulse in connection with said magnetic unit, a pulse mixing element mixing said pulses, signalling means in a normally open circuit, means operated by said mixing element for closing said circuit of said signalling means when uncompensated pulses are transmitted to said mixing element due to the failure of either said magnetic unit or said photoelectric unit to operate.

2. Apparatus as described in claim 1, said scale being composed of ferro-magnetic material with cut-in division marks having a length smaller than the width of said scale, said magnetic scanning and indicating unit comprising a first magnetic reading head, a second magnetic reading head, and a bridge circuit connecting said first with said second magnetic reading head, said first magnetic reading head scanning said scale above said division marks, said second magnetic reading head scanning division marks in said scale, amplifying means amplifying the voltage of said bridge circuit, and a counter operated with the amplified bridge voltage.

References Cited by the Examiner
UNITED STATES PATENTS

| | | | |
|---|---|---|---|
| 2,720,810 | 10/1955 | Senn | 33—125 |
| 2,866,946 | 12/1958 | Tripp | 323—53 |
| 2,875,524 | 3/1959 | Bower et al. | 33—125 |
| 3,096,511 | 7/1963 | Taras | 340—174.1 |

RALPH G. NILSON, *Primary Examiner.*